Figures 1, 2, 3, 4, 5:
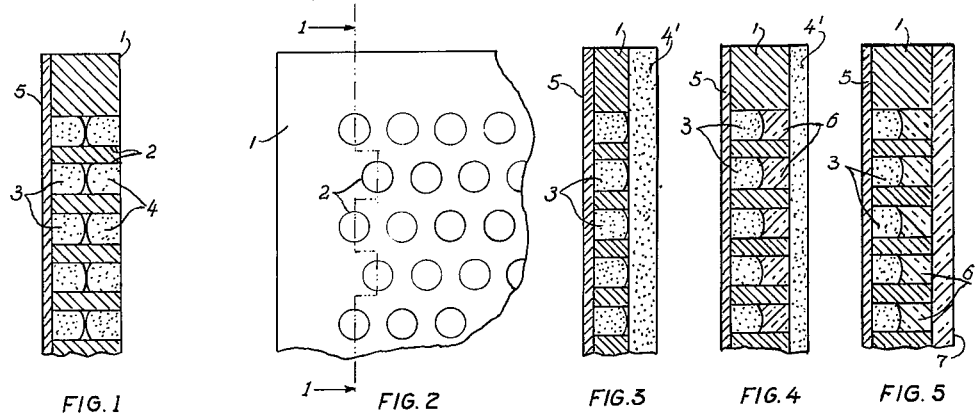

March 29, 1966 — R. K. H. GEBEL — 3,243,642

IMAGE INTENSIFIER

Filed Oct. 30, 1962 — 7 Sheets-Sheet 1

INVENTOR.
R. K. H. GEBEL
BY
ATTY.
AGENT.

March 29, 1966   R. K. H. GEBEL   3,243,642
IMAGE INTENSIFIER
Filed Oct. 30, 1962   7 Sheets-Sheet 2

INVENTOR.
R. K. H. GEBEL
BY
ATTY.
AGENT

March 29, 1966  R. K. H. GEBEL  3,243,642
IMAGE INTENSIFIER
Filed Oct. 30, 1962  7 Sheets-Sheet 3

INVENTOR.
R. K. H. GEBEL

March 29, 1966  R. K. H. GEBEL  3,243,642
IMAGE INTENSIFIER
Filed Oct. 30, 1962  7 Sheets-Sheet 4

INVENTOR.
R. K. H. GEBEL
BY
ATTY.
AGENT.

March 29, 1966   R. K. H. GEBEL   3,243,642
IMAGE INTENSIFIER

Filed Oct. 30, 1962   7 Sheets-Sheet 5

INVENTOR.
R. K. H. GEBEL

INVENTOR.
R. K. H. GEBEL

United States Patent Office 3,243,642
Patented Mar. 29, 1966

3,243,642
IMAGE INTENSIFIER
Radames K. H. Gebel, Dayton, Ohio, assignor to the United States of America as represented by the Secretary of the Air Force
Filed Oct. 30, 1962, Ser. No. 234,264
9 Claims. (Cl. 315—11)

The invention described herein may be manufactured and used by or for the United States Government for governmental purposes without payment to me of any royalty thereon.

This invention relates in general to the intensification of electron images and includes a plurality of image intensifier devices which are basically similar in construction and operation but are specialized to perform various functions, such as: the straight intensification of an electron image; the conversion of an electron image to an optical image; the conversion of an optical image, especially an infrared image, into an electron image; the storage of the information in an electron image, or in a video signal, to permit delayed viewing, prolonged viewing or, in a photographic application, to permit an increased exposure time for the recording of weak optical images of short duration; and, in a further photographic application, the direct application of an electron image to a photographic plate either through a relatively large Lenard window or through a transmission type secondary emitter. An important feature of the intensifiers to be described is their ruggedness and resistance to shock and vibration due to their unitized layer construction.

Briefly, the basic image intensifier, in accordance with the invention, comprises several elements in the form of layers clamped or otherwise held together. The main layer is a plate made of metal, an opaque conductive glass or plastic, or an opaque insulator with a thin conductive coating. Next in order from the main layer are an insulating layer, a thin conductive layer and a thin layer of an insulator, a photoconductive material, or a material exhibiting electron bombardment induced conductivity, depending upon the use to which the intensifier is to be put. The combined structure has a large number of closely spaced small passageways, of the order of 25 microns in diameter, drilled completely through it normal to the layers. The passageways in the main layer are filled with a phosphor material only, or with a phosphor material at one end and a photoemissive material at the other, or are left empty depending upon the intended specialized use. The opaqueness of the main layer prevents the spread of the light produced in each phosphor element and prevents loss of resolving power from this cause. In this respect, the main layer is useful separately as a high resolution image intensifier without the memory feature or as a high resolution viewing screen. As an alternative construction, the image intensifiers may be fabricated using optical fibers rather than drilled plates.

Figures 6, 7, 8, 9:
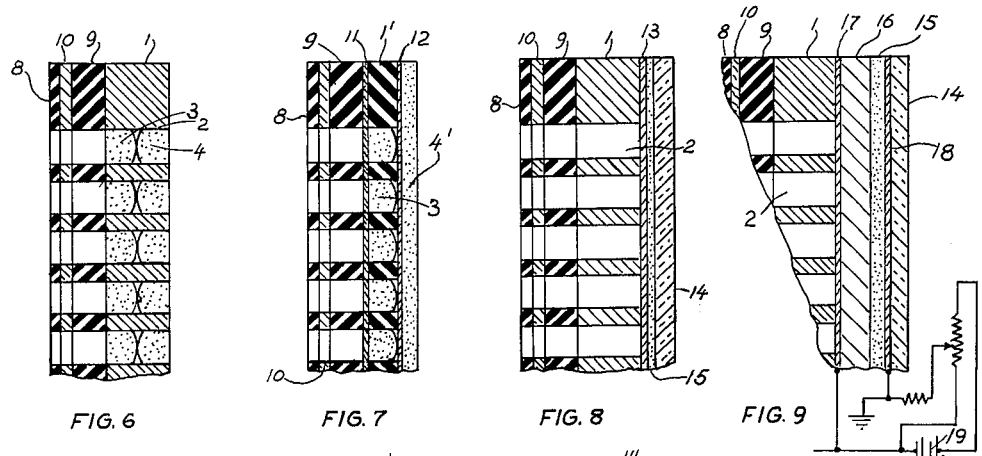
Figure 14:
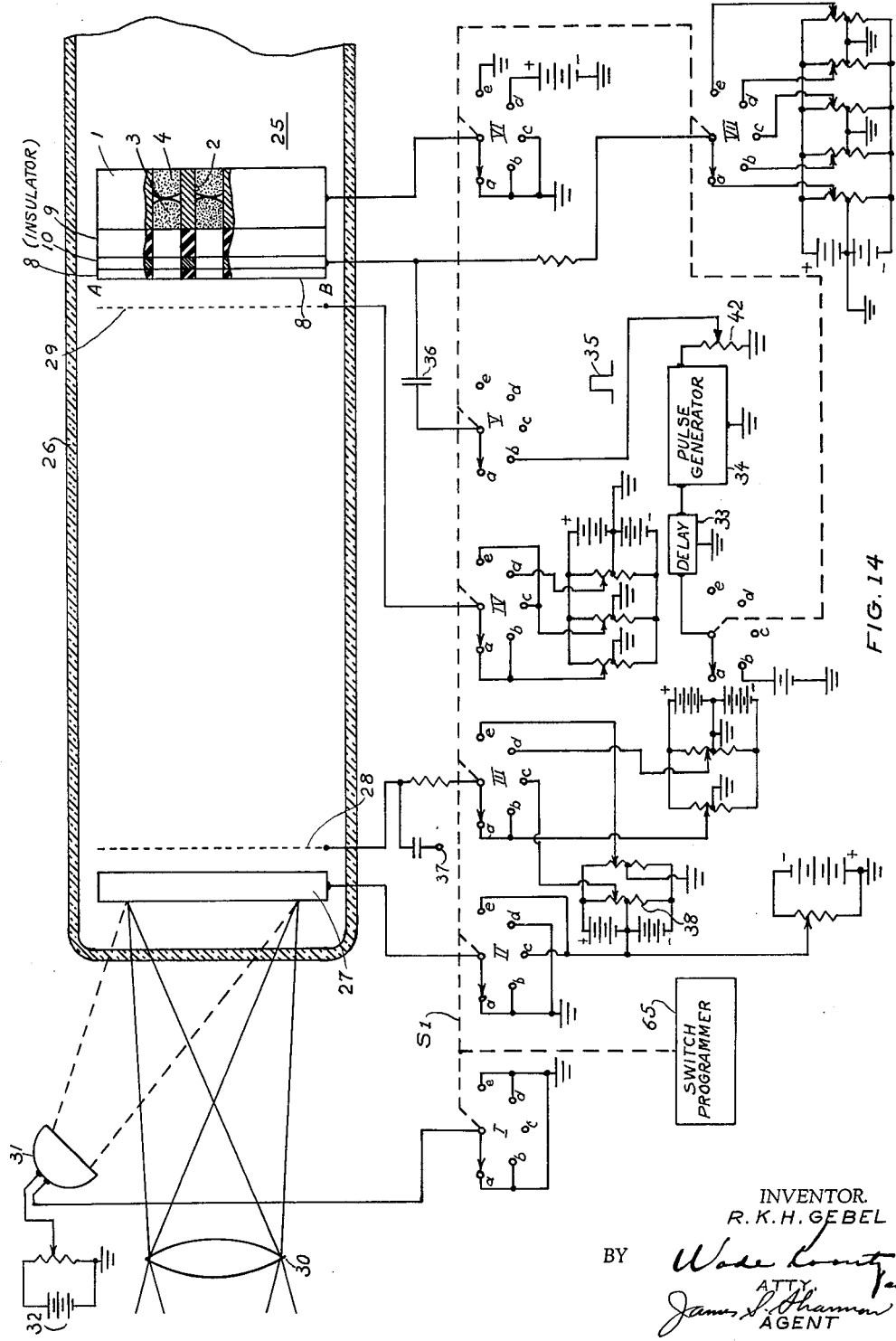
Figure 15:
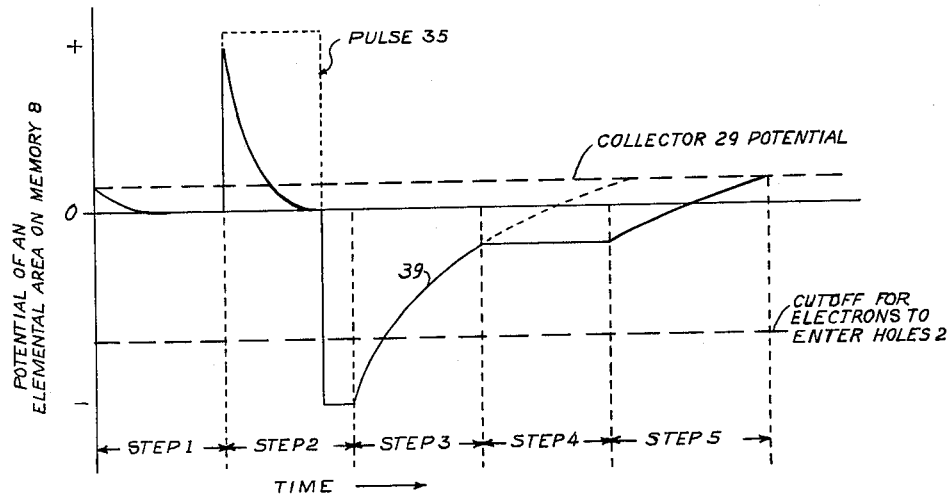
Figure 16:
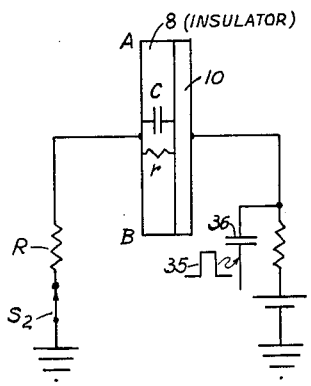
Figure 17:
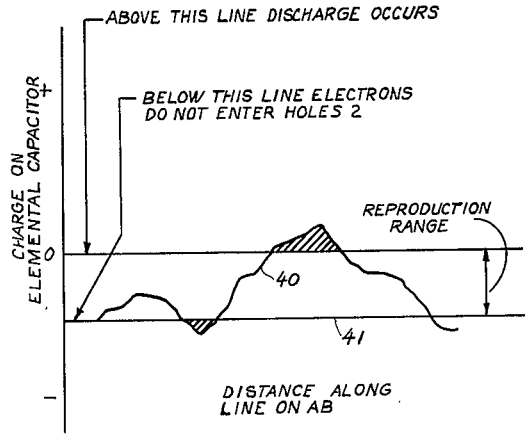
Figure 18:
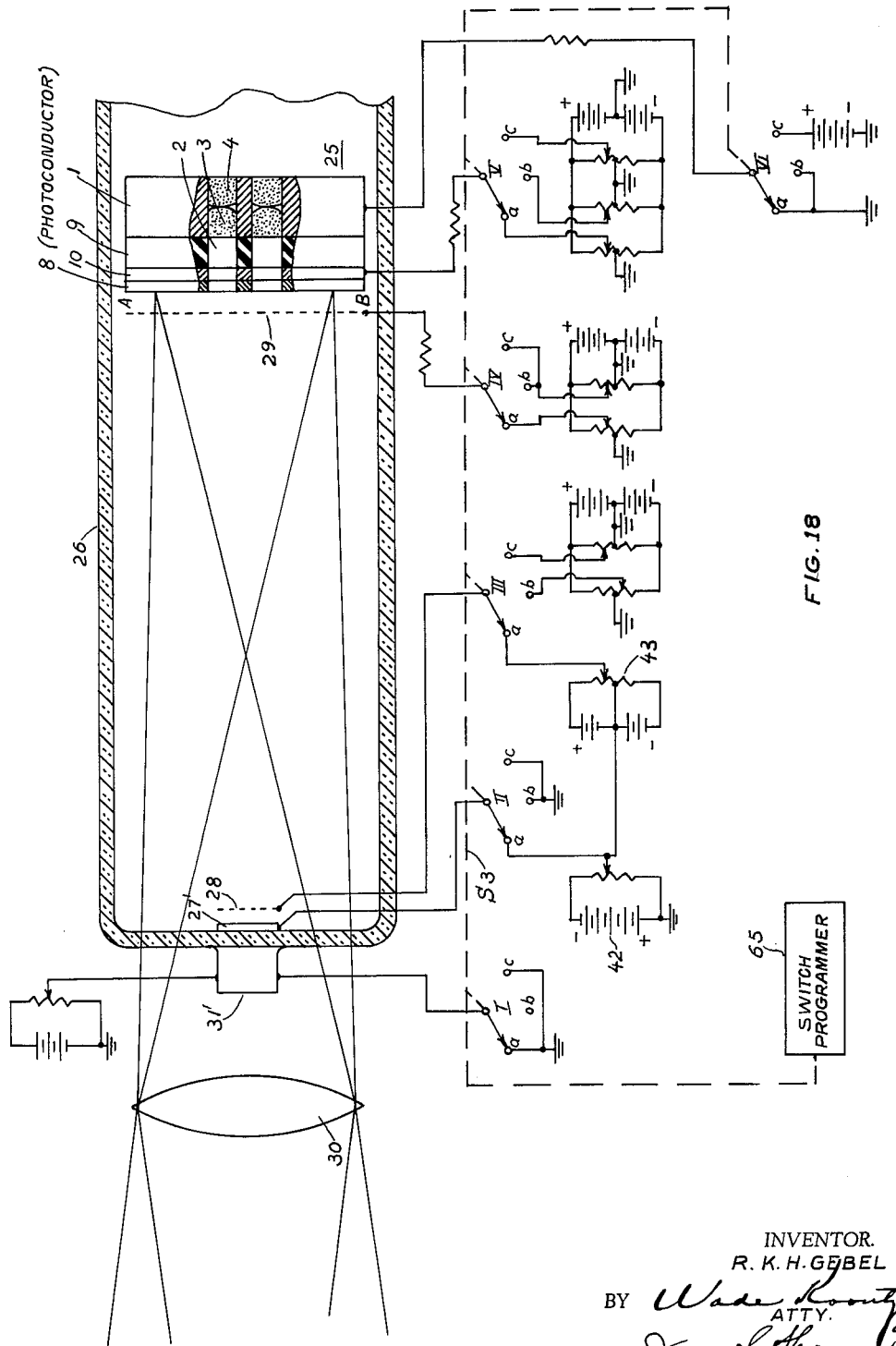
Figure 19:
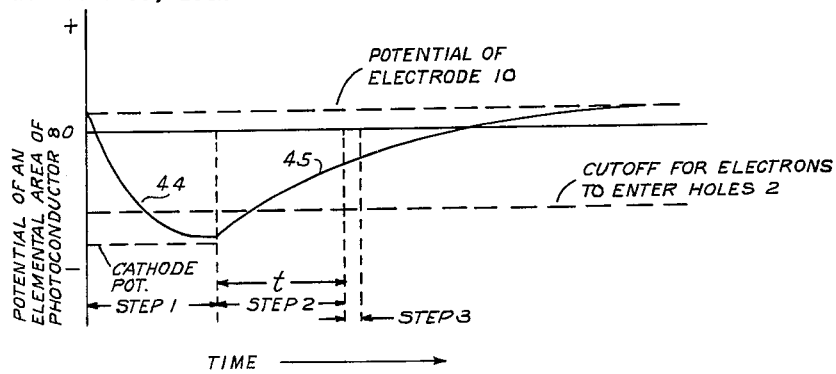
Figure 20:
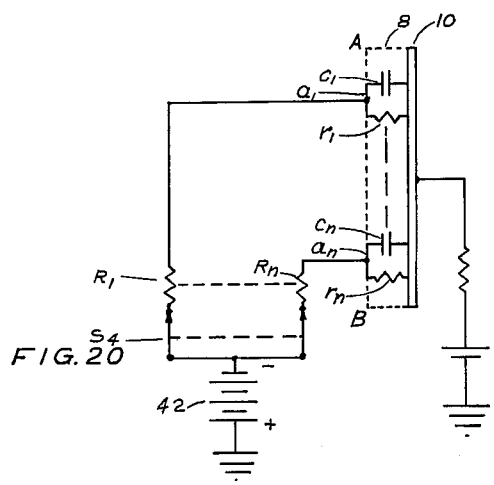
Figure 21:
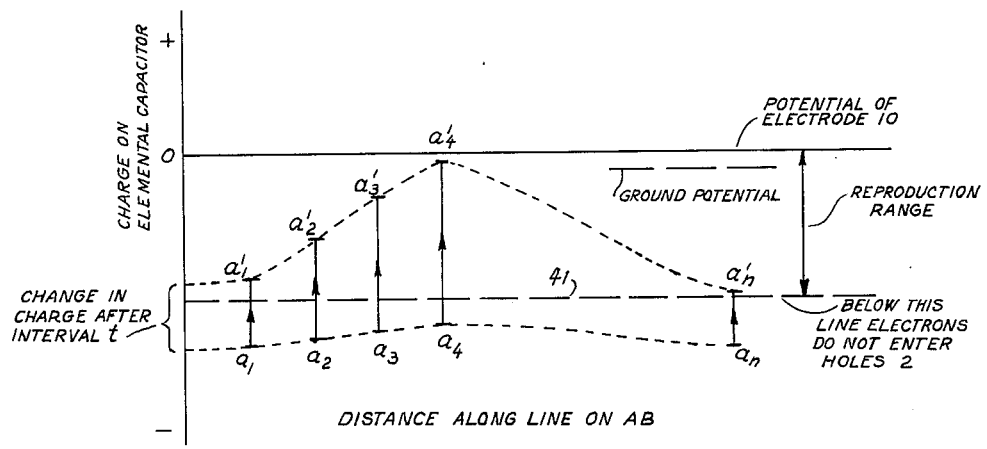
Figure 22:
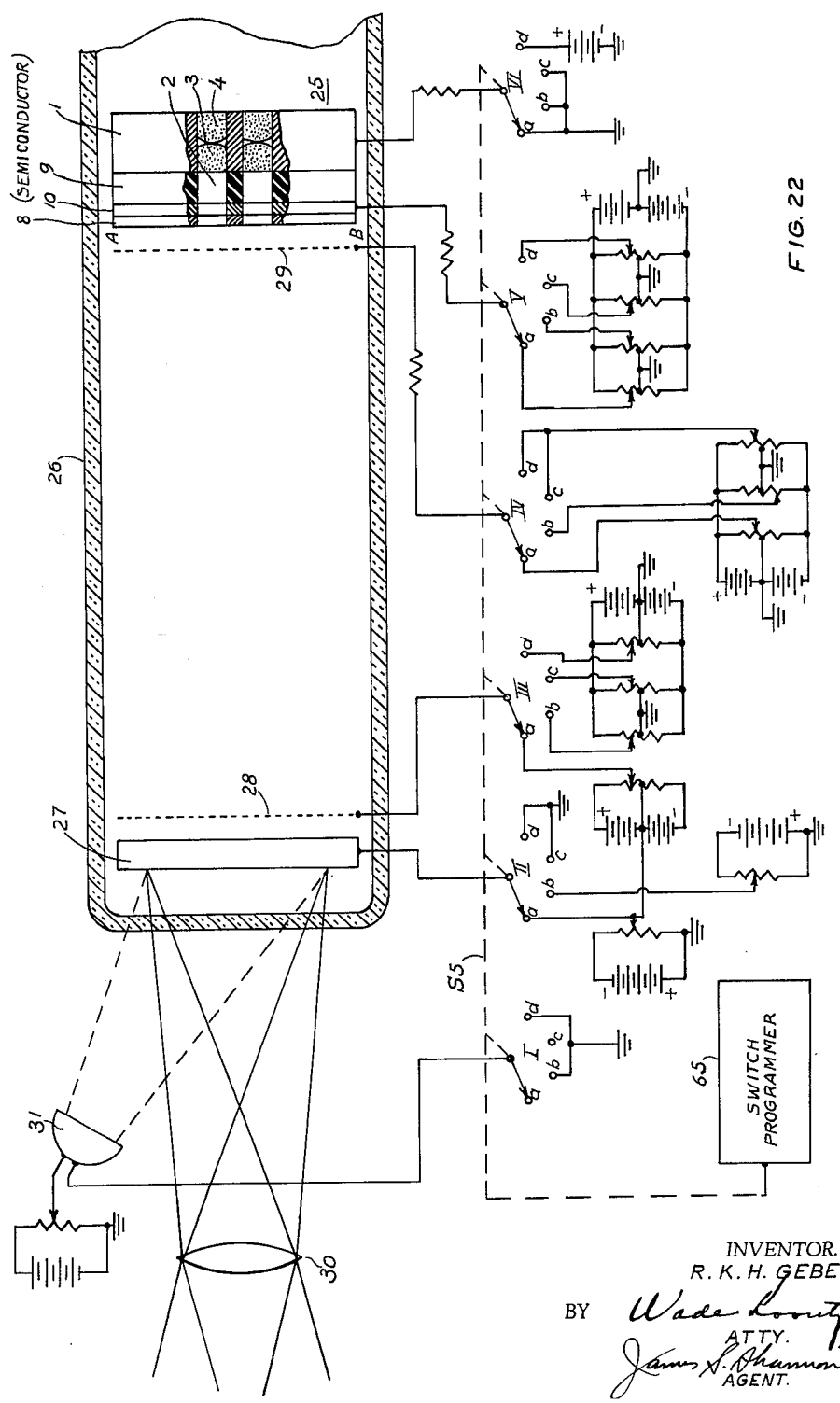
Figure 23:
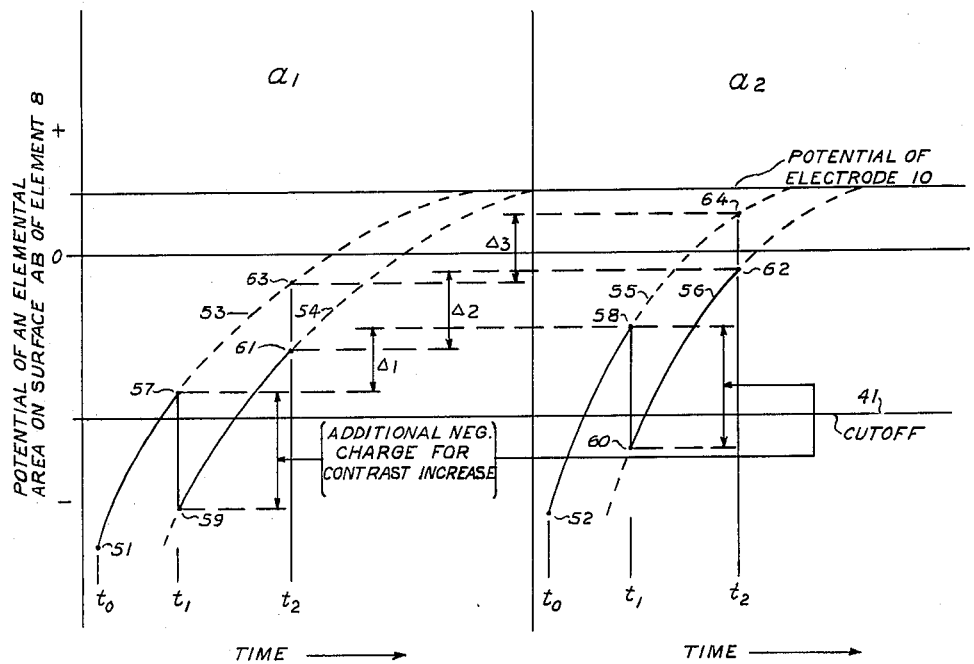

A more detailed description of the construction and operation of the various forms of the invention will be given with reference to the specific embodiments thereof shown in the accompanying drawing in which FIGS. 1 and 2 show a simple image intensifier using a phosphor carrier in accordance with the invention, FIG. 3 shows a modification of FIG. 1, FIG. 4 shows a further modification of the image intensifier of FIG. 1, FIG. 5 shows a phosphor screen using a carrier plate in accordance with the invention, FIG. 6 shows a basic structure which may be used in the construction of an image intensifier with a memory capability, a high gain image intensifier using electron bombardment induced conductivity, or an optical to electron image converter using a photoconductor, FIG. 7 is a modification of FIG. 6, FIG. 8 shows a Lenard window in accordance with the invention, FIG. 9 shows an image intensifier for direct electron image exposure of a photographic plate, FIGS. 10–11, 12 and 13 illustrate the manner in which the structures of FIGS. 6, 4 and 8, respectively, may be realized with optical fiber materials, FIG. 14 illustrates a system using the structure of FIG. 6 as a memory-intensifier, FIG. 15 illustrates a complete cycle of operation of FIG. 14, FIG. 16 is the equivalent circuit of FIG. 14, FIG. 17 illustrates the production range of FIG. 14, FIG. 18 illustrates a system using the structure of FIG. 6 as an optical image to electron image converter for infrared, FIG. 19 illustrates the operation of FIG. 18, FIG. 20 is an equivalent circuit for FIG. 18, FIG. 21 further illustrates the operation of FIG. 18, FIG. 22 is a system using the structure of FIG. 6 as a high gain image intensifier employing electron bombardment induced conductivity, and FIG. 23 illustrates a technique for increasing the contrast in electron images produced by FIGS. 18 and 22.

Referring to the drawing, FIGS. 1 and 2 show one of the elements of the more complicated intensifier devices to be described later but which element, as stated above, also has utility as a high resolution electron image intensifier or phosphor screen when used alone. The element comprises a metallic plate having a large number of closely spaced very small holes or passageways 2 drilled therein. The size and spacings of the holes are exaggerated in the drawing for the sake of clarity, the holes actually having diameters and spacings of the order of 25 microns or less so that preferably several holes are included within the smallest resolvable elemental area of the electron image to be intensified or reproduced. Holes of this fineness may now be drilled in plates of metal or other materials by concentrated electron beam drilling techniques. The holes are filled from one side with a phosphor material 3 and from the other side with a photoemissive material 4.

The element shown in FIG. 1 is an electron image intensifier. The input electron image impinges on phosphor 3 from the left through a thin electron pervious metallic coating 5 which acts as a reflector to prevent light feedback from phosphor elements 3. The electron energies are converted by the phosphor elements into photons which are absorbed by the photoemissive elements 4 causing photoelectrons to be emitted from the right side of the plate. The ratio of photoelectrons to primary electrons arriving from the left is greater than unity so that an intensification of the incident electron image occurs. In image intensifiers having continuous phosphor and photoemissive layers, the spreading of the light in the phosphor causes the emission of electrons from the output side to occur over a larger area than the elemental area of impinging electrons on the input side, so that a loss of resolving power occurs. This spreading is prevented and the resolution correspondingly improved in FIG. 1 since the light generated in any phosphor element 3 is restricted to the corresponding photoemissive element 4 by the opaque internally reflecting walls of the holes 2.

FIG. 3 shows a modification of FIG. 1 in which the photoemissive material 4' is in a continuous layer over the surface of element 1 rather than in the holes as in FIG. 1. In this case the metallic member 1 may be made thinner and the holes completely filled with the phosphor material 3. Where the metallic member 1 has the same thickness as in FIG. 1, the phosphor elements 3 should not completely fill the holes but should retain their optimum thickness with the resulting void filled with any suitable transparent plastic material 6, as shown in FIG. 4.

FIG. 5 is a high resolution phosphor screen for the production of a visual image. The construction is the same as in FIG. 4 with the photoemissive layer replaced by a layer of glass 7 to preserve the vacuum, since the screen would normally be located in the wall of an evacuated envelope. The screen may also be located in contact with the inner surface of the envelope in which case 7 may represent the glass envelope wall. The phosphor screen may also be constructed as in FIG. 3 with the photoemissive layer 4' replaced by a glass layer such as 7 in FIG. 5. The input to the left side of the phosphor screen may be either in the form of an electron image or in the form of a modulated scanning electron beam.

Although the element 1 in FIGS. 1–4 is preferably made of metal as stated, it could also be constructed of an opaque conductive glass or plastic. Further, the element 1 in FIGS. 3 and 4 could be constructed of an opaque insulating material; however, in this case, a thin transparent metallic film (not shown) should be situated between element 1 and the photoemissive layer 4' to provide a return path for electrons to the photoemitter.

The basic solid state structure shown in FIG. 6 may be used as an image intensifier with a memory, as an element for converting an optical image in certain radiation wavelengths such as infrared into an electron image, or as an image intensifier employing electron bombardment induced conductivity, depending upon the material used for layer 8 and the electrical parameters of the associated circuit. The structure comprises a phosphor carrier metallic plate 1 having closely spaced small diameter passageways 2 filled with phosphor and photoemissive materials 3 and 4. The plate 1 structure is identical in all respects to the plate 1 structure of FIG. 1. Next to plate 1 is an insulating layer 9, and then a thin conductive layer 10 on which is deposited the layer 8. The holes 2 of plate 1 are continued through layers 8, 9 and 10.

As stated above, the use to which the structure of FIG. 6 is to be put determines the material used for layer 8. When the structure is to be used as an image intensifier with a storage or memory capability the layer 8 is composed of a suitable insulating material such as magnesium fluoride. The mode of operation is then as follows: By secondary emission effects, a charge distribution is produced on the surface of layer 8 corresponding to the current density distribution in an impinging electron image or in accordance with the modulation of a scanning electron beam. After the charge has been established on the insulator 8, the metal element 1 is made positive relative to conductive layer 10 and the insulator 8 is then uniformly flooded with electrons from the left. The potential of the insulator 8 at each hole 2 determines the number of flooding electrons entering the hole. Therefore, the hole current distribution throughout the structure corresponds to the charge distribution on insulator 8 and therefore to the original electron image or scanning beam modulation. The electrons entering the insulator holes are accelerated by the higher potential of element 1 and strike the phosphor elements 3, resulting in an intensified electron image being emitted from the right side of the element 1 by the same process as already described for FIG. 1. The charge distribution on insulator 8 is not altered by the flooding process but only by leakage across the insulator. Therefore, the length of time during which the image information can be stored and an intensified electron image obtained by electron flooding is limited only by the insulator leakage, which may be made quite low. A more detailed explanation of this mode of operation of FIG. 6 will be given later with reference to FIG. 14.

Where the structure of FIG. 6 is to be used to convert an optical image, at infrared or X-ray wavelengths, for example, the layer 8 is made of a photoconductive material. Examples of photoconductive materials suitable for this purpose are: antimony trisulphide ($Sb_2S_3$), cadmium sulphide (CdS), zinc sulphide (ZnS), cadmium selenide (CdSe), lead sulphide (PbS), lead oxide (PbO) and an alloy of CdS and CdSe. These materials may be doped with various elements such as gallium, indium or copper to widen the spectral response. The optical image formed on the photoconductor 8 causes its conductivity to vary over its area in accordance with the radiation intensity variation in the optical image. The capacitance between the surfaces of the photoconductive layer is charged to a uniform potential, i.e., all of the elemental capacitances defined by elemental areas of the photoconductor are charged to the same potential, by applying a constant potential between the electrode 10 and the outer surface of photoconductor 8. The charging potential is then removed and the elemental capacitors begin to discharge at different rates as determined by the conductivity variation over the area of the photoconductor. This results after a time in a potential distribution over the photoconductor surface corresponding to the conductivity distribution and, therefore, to the radiation intensity distribution in the optical image. This potential distribution is converted into an intensified electron image by uniformly flooding the photoconductive layer 8 with low velocity electrons which pass through holes 2 in numbers determined by the potential distribution over the face of layer 8. The passed electrons are intensified by the phosphor-photoemitter elements of metallic member 1 by the same process as described for FIG. 1. A more detailed explanation of this mode of operation will be given later in connection with FIG. 18.

The basic structure of FIG. 6 may also be used as a high gain image intensifier employing electron bombardment induced conductivity in a semiconductor. For this application, the layer 8 is made of a material whose conductivity may be varied by electron bombardment. Examples are arsenic triselenide ($As_2Se_3$), arsenic disulphide ($As_2S_2$) and arsenic trisulphide ($As_2S_3$). The operation in this case is similar in all respects to the preceding mode of operation except that the conductivity of layer 8 is varied by an impinging electron image rather than by an optical image. A more detailed description of this mode will be given in connection with FIG. 22.

The basic structure of FIG. 6 contains the image intensifier of FIG. 1 as one of its elements. The intensifiers of FIGS. 3 and 4 may be substituted for the illustrated intensifier element. Also, the electron image to optical image converter of FIG. 5 may be substituted for the intensifier of FIG. 1 in FIG. 6 for purposes of photographic recording or visual observation of the stored image.

FIG. 7 illustrates the basic structure of FIG. 6 using an intensifier of the type shown in FIG. 3 except that the element 1' is made of insulating material rather than metal as in FIG. 3. In this case a thin metallic electron pervious electrode 11 is provided to act as an accelerating electrode and a thin transparent electrode 12 is provided as an electrical connection to the photoemissive layer 4'. When the intensifier of FIG. 3 is used in FIG. 6, both of these functions are performed by the metal plate 1.

FIG. 8 shows another variation of the basic FIG. 6 structure to provide a Lenard window of relatively large area. A Lenard window is a device for permitting the electrons of an electron image to pass through the wall of the evacuated envelope for direct application to a photographic plate. Direct electron bombardment accomplished in this manner can produce latent images in very slow extremely fine grain photographic emulsions that for adequate exposure to light would require impractically high image brightness and long exposure times. A Lenard window consists of a sheet of metal such as aluminum foil which is thin enough to permit the passage of electrons but not gas molecules. Heretofore, Lenard windows have been restricted to small sizes because of the pressure differential across the foil. In accordance with this feature of the invention, a Lenard window is constructed by applying the foil 13 over element 1 with the holes 2 empty, as seen in FIG. 8. In this way, element 1, which is preferably made of metal but may be made of an insulating material, acts as a support or substrate for the foil and the limitation on window size is transferred from the strength of the foil to the strength of member 1. This permits a much larger window to be constructed. A photographic plate 14 having a coating of emulsion 15 is shown in contact with the window.

Although the Lenard window in FIG. 8 is shown in combination with elements 8, 9 and 10 of FIG. 6, it is not restricted to use in this combination but may be used to pass the electrons of an electron image from any source, or the electrons from a moving beam for photographically recording the beam position and modulation.

FIG. 9 illustrates another method of applying an electron image, or beam, directly to a photographic plate. As in the Lenard window construction of FIG. 8, the element 1, of metal or an insulating material, with the holes 2 open, is used as a substrate to support the secondary emitter which comprises a thin electron pervious metal layer 17 and a relatively thin layer of transmission secondary emissive material 16. No attempt is made in the drawing to illustrate relative thicknesses of the various elements. By properly choosing the relative potentials of element 1 and element 10, or element 17 and element 10 if element 1 is an insulator, electrons entering holes 2 are accelerated toward element 17 through which they pass to strike element 16 and emit secondary electrons in a ratio greater than unity. The emulsion 15 of photographic plate 14 is placed in contact with the secondary emissive element 16, and either plate 14, if metallic, or a metallic layer 18 which is used if plate 14 is a nonconductor, as shown, is maintained at a higher potential than element 17, by source 19, to accelerate the secondary electrons emitted in element 16 and cause them to bombard the emulsion 15.

The metallic film 17 in FIG. 9 may be of aluminum or gold about 500 A.° thick. Suitable materials for the secondary emissive layer 16 are: potassium chloride (KCl) with a thickness of 500 A.°, giving a secondary emission ratio of 4 with an accelerating potential of 3.5 kv.; magnesium oxide (MgO) with a thickness of 20 microns, giving a secondary emission ratio of 3.5 with an accelerating potential of 3 kv.; or barium fluoride ($BaF_2$) with a thickness of 20 microns, giving a secondary emission ratio of 5 with an accelerating potential of 3 kv. The accelerating potential is established between elements 17 (or 1, if metallic) and 10.

The above described device of FIG. 9 may be used in place of a Lenard window where the added sensitivity due to the electron multiplication of the secondary emitter is desired. Although shown in combination with elements 8, 9 and 10, it may be used with an electron image input from any source, or with an electron beam input, as in the case of the Lenard window.

All of the structures in FIGS. 1–9 may be fabricated using present day solid state circuit manufacturing techniques. As mentioned earlier, the holes 2 may be drilled with high energy electron beam drilling methods, which can produce holes of 25 microns diameter or less. In the fabrication of the structure in FIG. 6, for example, the insulating plate 9 may be coated on one side with an aluminum layer 10 by vacuum deposition. In like manner, a layer of magnesium is deposited on the layer of aluminum. The assembly is then heated in the presence of fluorine gas which combines with the magnesium to produce the layer 8 of magnesium fluoride. Metallic plate 1 is then clamped to plate 9 and the holes 2 drilled. Plate 1 is then separated from plate 9 and the holes filled with phosphor and photoemissive material by forcing the materials in from both sides. Plate 1 is then reassembled and clamped to plate 9, with the holes in alignment to form the completed structure. If plate 1 is made of an insulating material, a conductive layer, such as layer 11 in FIG. 7, is deposited thereon before the holes are drilled.

Figures 10, 11, 12, 13:
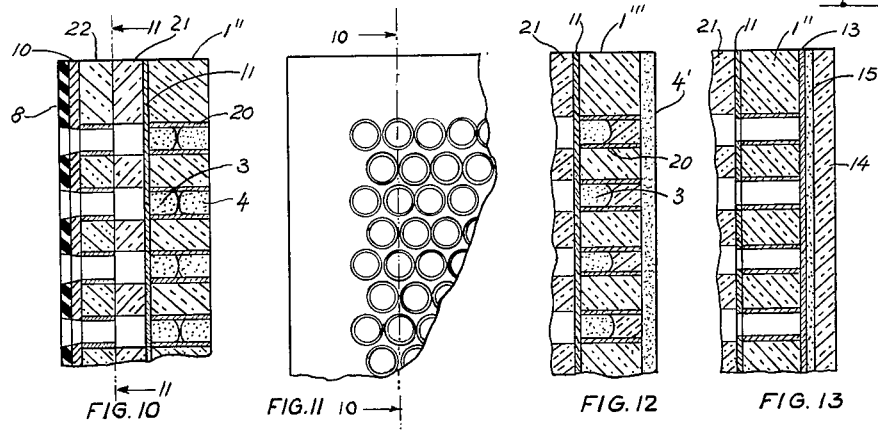

Structures equivalent to those shown in FIGS. 1–9 may also be fabricated from optical fibers. FIGS. 10–13 show several examples. FIGS. 10–11 show a structure equivalent to the structure of FIG. 6. Rods and bars composed mainly of a very large number of parallel contiguous glass optical fibers are now generally available from glass product manufacturers. The fibers may be had coated with a thin layer of metal, or with a glass of lower refractive index than the fiber glass, or with a plastic of low refractive index. The opaque or low refractive index coatings are for the purpose of preventing or reducing light leakage from one fiber to adjacent fibers. FIGS. 10–11 show a structure that is the equivalent of the structure of FIG. 6. In fabricating FIG. 10 the element 1″, corresponding to element 1 in FIG. 6, is sliced from an optical fiber bar, preferably one in which the fibers have metallic coatings. By using a selective etching agent, the glass fiber cores are chemically removed from element 1″, leaving the metal coatings 20. The resulting holes are filled with phosphor 3 and photoemissive material 4, as in the fabrication of FIG. 6. A thin electron pervious coating 11 of a suitable metal such as aluminum or gold is vacuum deposited on one side of plate 1″. Next, a second plate 21 is cut from the fiber bar and the complete fibers, both core and metallic coating, are chemically removed. If the fibers have a non-metallic coating only the cores need be removed. Finally, a third plate 22 is prepared with either the fiber cores or both cores and coatings removed. This plate is vacuum coated with a metallic layer 10, which then receives a magnesium coating converted by fluorine into the magnesium fluoride coating 8, as in the case of FIG. 6 described above. The three plates are then assembled and clamped together with the holes in alignment. The plate 21 is an insulator serving the same purpose as element 9 in FIG. 6. This plate is necessary even though the fiber coatings are removed from plate 22 or are non-metallic since in the process of depositing conductive layer 10 some metal may coat the walls of the holes in plate 22 and short circuit layer 10 to layer 11.

FIGS. 12 and 13 are further examples of the use of optical fiber materials to produce structures equivalent to those shown in FIGS. 1–9. FIG. 12 is the same as the basic structure of FIG. 10 but using as an element an image intensifier of the type shown in FIG. 4. In this case the cores of the optical fibers are only partly etched away to provide space for the phosphor elements 3. FIG. 13 illustrates the basic structure of FIG. 10 with a Lenard window of the type shown in FIG. 8 substituted for the image intensifier. As in the case of FIG. 8 this Lenard window may also be used separately from elements 8, 10, 22 and 21. It will be obvious from FIG. 13 how the structure of FIG. 9 may be constructed of optical fiber materials.

As stated earlier, the basic structure of FIG. 6 may be specialized for several different modes of operation. FIG. 14 illustrates a system employing this structure as an electron image intensifier with a memory or storage capability. When used in this manner, the element 8 is any suitable insulator which may be operated as a secondary emitter with an emission ratio greater than unity, magnesium fluoride being an example. The solid state structure 25, which is the structure shown in FIG. 6, is contained in an evacuated envelope 26 along with a photocathode 27, an intensity control grid 28 and a collector grid 29. A lens system 30 is used to form an optical image of an object on the photocathode 27 which emits electrons from each elemental area in proportion to the radiation intensity at that area. The resulting electron flow from the photocathode, the cross-section of which is an electron image of the optical image on the photocathode, travels toward the insulator 8 and is focused thereon by suitable magnetic or electrostatic focusing means (not shown). In order to provide a uniform flow of flooding electrons from the photocathode to the insulator 8, for reasons which will be apparent later, a light source 31, energizable from power source 32, is provided for uniformly illuminating the input side of the photocathode 27. A switch S1, having ganged banks I through VIII of five contacts each, is provided to supply the proper operating potentials to the various elements of the system in each of the five successive steps that constitute a complete cycle of operation. These five steps will now be explained in detail:

*Step 1.*—The purpose of this step is to establish the exposed surface of insulator or memory element 8 at an equilibrium potential near ground or zero potential in order to remove any substantial positive charge that it may have. In this step, S1 is in position "*a*," light source 31 is energized and memory 8 is flooded with a uniform flow of electrons from the photocathode. Since grid 29 and conductor 10 are only slightly positive relative to the photocathode the velocity of the electrons impinging on the memory 8 is low enough that the secondary emission ratio is less than unity. Therefore, memory 8 receives more electrons than it loses to collector grid 29 and its potential is progressively lowered until an equilibrium potential is reached slightly below the potential of grid 29, and therefore at or near ground, where the electrons passing through grid 29 return to it and no further negative charge is received by element 8. This is illustrated in FIG. 15 for an elemental area on memory 8. Since all elemental areas reach the same equilibrium potential, the potential on the surface of memory 8 is uniform at the end of this step.

*Step 2.*—The purpose of this step is to establish the surface of memory 8 at a uniform negative potential relative to ground in order to prepare the memory to receive the electron image in step 3. How this is accomplished may be seen by reference to the equivalent circuit of FIG. 16. At the start of step 2, when S1 reaches contacts "*b*," a trigger pulse is generated by closure of contact VIII*b*. This pulse is slightly delayed by element 33 and applied to pulse generator 34 which generates a single rectangular pulse 35 that is applied through contacts V*b* and coupling capacitor 36 to electrode 10. At the instant pulse 35 raises memory 8 above its equilibrium potential electrons again impinge on its surface which in effect connects the exposed surface AB of memory 8 to ground through a very low resistance R representing the resistance along the electron stream and through the photocathode to ground. The capacitor C represents the capacitance between the surfaces of memory insulator 8, and $r$ represents the leakage resistance of the insulator, which is very high. At the leading edge of pulse 35 the potential of surface AB of memory 8 rises abruptly by substantially the full pulse voltage, as shown in FIG. 15. The potential then falls exponentially toward ground as C charges, finally reaching ground when C is fully charged to the pulse voltage and no further charging current flows through R. The pulse duration is made sufficiently long for the foregoing state to be reached. At the trailing edge of pulse 35, shown dotted in FIG. 15, the potential of electrode 10 drops abruptly to its bias voltage, which is near ground, carrying the surface AB of memory 8 below ground by substantially the pulse magnitude, as seen in FIG. 15. Since surface AB is now too negative for electrons to reach it, the connection between AB and ground is in effect broken, as by opening switch S2 in FIG. 16, at the trailing edge of pulse 35. Because of the long time constant $rC$, due to the high value of $r$, the potential between the surfaces of memory 8 falls at a very low rate. The memory 8 is now ready to receive the electron image.

*Step 3.*—The purpose of this step is to establish a potential pattern on the surface AB of memory 8 representative of the electron density distribution in the electron image produced by photocathode 27, which image in turn represents the optical image formed on the photocathode by lens system 30. With S1 on its "*c*" contacts, light 31 is extinguished and the potentials of photocathode 27 and grid 28 are lowered sufficiently that the electrons constituting the electron image from photocathode 27 impinge on the surface AB with sufficient energy that the secondary emission ratio of element 8 is greater than unity. The intensity of the electron image may be adjusted as desired by potentiometer 38 which controls the potential of grid 28 relative to the photocathode. With a secondary emission ratio greater than unity, each elemental area of surface AB has a net loss of electrons proportional to the density of the electron current in that part of the image impinging upon it. The potential of each elemental area of surface AB therefore becomes progressively less negative at a rate directly related to the density of the electron stream striking that area, so that after a period of time there is a potential distribution over the surface AB corresponding to the electron density variation in the electron image. The line 39 in FIG. 15 represents the rise in potential of an elemental area by the above process. The rise is arrested at the end of step 3. Shortening step 3 would have resulted in a lower potential while lengthening it would have resulted in a further rise in potential along the broken portion of line 39. The potential of an elemental area can not rise above the potential of collector electrode 29 since, when this potential is reached, the secondary electrons return to the surface AB and the net loss of electrons is reduced to zero. The length of step 3 equals the dwell time of S1 on its "*c*" contacts and may be controlled in any suitable manner depending upon the type of switch used.

*Step 4.*—The purpose of step 4 is to read the information stored on the surface AB of the memory 8 as a potential distribution. For this step, S1 is on its "*d*" contacts. Light 31 is energized to cause the photocathode, which has been raised to ground potential, to flood the surface with a uniform shower of relatively low velocity electrons. The number of electrons that enter each of the holes 2 in surface AB is a function of the potential of insulator 8 at that point. Consequently, the density of electron flow into the holes and past conductor 10 corresponds over the surface AB to the electron density distribution in the initial electron image. By proper choice of the circuit parameters, it is possible to have the density of the electron flow in the holes exceed the density in the corresponding part of the initial electron image so that an image intensification occurs. The electrons entering the holes in surface AB are accelerated toward the phosphor elements 3 under the influence of the accelerating field established by the high potential applied to element 1, which in the illustrated case is metallic, through contact VI*d*. The resulting light produced by the phosphor elements causes an intensified electron image to be emitted by the photoemissive elements, as explained for FIG. 1. The electron pervious reflective coating 5 of FIG. 1 has been omitted from the structure 25 of FIG. 14 but could be used if desired to prevent light loss from the phosphor elements in the backward direction and thus to increase the efficiency of the intensifier.

The surface AB of memory element 8 may be considered to be composed of a great number of contiguous elemental areas, an elemental area representing the limit in the resolving power of the system. Each elemental area constitutes with the conductive layer 10 an elemental capacitor, the sum of all of which in parallel is the capacitor C of FIG. 16. The potential distribution over surface AB represents a corresponding charge distribution in the elemental capacitors since there is no potential variation over the surface of the conductor 10. During step 4, these capacitors are discharging, however the discharge rate is so slow, due to the very high value of the leakage resistance $r$, that the potential of the elemental area represented in FIG. 16 has been shown as constant. Nevertheless, given sufficient time, all of the elemental capacitors will completely discharge and the potential of the surface AB will become uniform and equal to that of electrode 10. The stored information is then lost. However, up to that time, an intensified electron image of the stored information may be reproduced any number of times or sustained for any period by flooding the memory with electrons.

It is immaterial during step 4 whether the optical image on the photocathode 27 is present or absent. If present, and the photocathode is not driven to maximum output by the light from source 31, there will be a low contrast electron image in the flooding electrons. However, this is favorable since its effect is to increase the contrast in the electron image passing through the holes in the surface AB.

*Step 5.*—The purpose of this step is to erase the information on the surface AB of memory element 8. This is accomplished, with S1 on its "*e*" contacts, by lowering the potential of the photocathode 27, as in step 3, to increase the velocity of the electrons impinging on surface AB sufficiently that the secondary emission ratio is greater than unity. The surface AB then rises in potential, through a net loss of electrons, until a uniform equilibrium value near or at the potential of collector electrode 29 is attained. This is illustrated in FIG. 15.

In illustrating the operation of FIG. 14 in FIG. 15 no attempt has been made to show the proper relative durations of the various steps.

As stated in step 3, the time during which the charge distribution is being formed on memory 8 may be controlled by controlling the dwell time of S1 on contacts "*c*." This may also be accomplished by setting S1 on its "*c*" contacts, biasing the intensity control grid 28 beyond cutoff by an appropriate adjustment of potentiometer 38 and applying an unblanking pulse to the control grid through terminal 37 at the instant it is desired to store the information in the optical image.

FIG. 17 illustrates the reproduction range of the apparatus of FIG. 14. Line 40 represents the charges on the elemental capacitors of memory 8 along any line on its surface AB. If the charge on any capacitor is more negative than a certain value, represented by line 41, none of the flooding electrons traveling toward the elemental area corresponding to that elemental capacitor will enter the holes 2 within that elemental area but will all turn around and be collected by electrode 29. On the other hand, if any elemental capacitor has a positive charge, that charge will be neutralized by the flooding electrons and the information represented by it will be lost. Consequently, there is provided the useful capability to remove the image modulation at the upper level, or at the lower level, or at both upper and lower levels, or, if desired, to reproduce the entire modulation range. Clipping at either the upper or the lower level may be accomplished by adjusting the magnitude of pulse 35 at potentiometer 42, which has the effect of adjusting the vertical position of curve 40 in FIG. 17. Thus, by increasing the pulse magnitude, the curve is lowered and more is removed from the bottom and less from the top. A further control can be effected by adjusting the distance between the maximum and minimum points of curve 40. This may be accomplished by either controlling the contrast in the incident electron image by adjusting the potential of grid 28, or by controlling the exposure time of the memory to the electron image by adjusting the dwell time of S1 on its "*c*" contacts or the duration of the unblanking pulse at terminal 37, or by a combination of these two methods. It will be clear from FIG. 17 that, by controlling the magnitude range of the charges represented by curve 40, the clipping at both top and bottom may be further controlled or the curve may be caused to lie entirely within the reproduction range.

A second mode of operation of the basic structure of FIG. 6 in which an optical image, particularly in the infrared or X-ray ranges, may be converted to an intensified electron image, is shown in FIG. 18. In this embodiment, the element 8 of the basic structure 25 is made of a photoconductive material, several examples of which have already been given. For the infrared application, which is the application illustrated, a photocathode 27', energized by light source 31', is preferred as a source of flooding electrons since it introduces a minimum of heat into the system. For applications other than infrared, where the photo-conductor 8 is not heat sensitive, a thermionic cathode may be used. Envelope 26 is evacuated and a suitable focusing means (not shown) which may be magnetic or electrostatic is employed to focus the flooding electrons from photocathode 27' onto the surface AB of the photoconductive element 8. The infrared image to be converted to an electron image is formed on the surface AB of element 8 by lens system 30. A complete cycle of operation of the system of FIG. 18 comprises four steps which are explained in detail, as follows:

*Step 1.*—The purpose of this step is to establish the surface AB of photoconductor 8 at an initial or starting potential which is near the potential of cathode 27' and considerably negative relative to ground. The infrared image is present on the photoconductor surface AB during this step. With S3 on its "*a*" contacts, light source 31' is energized, photocathode 27' is considerably negative relative to ground through connection to direct current source 42, control grid 28 has a suitable bias relative to cathode 27' derived from potentiometer 43, grid 29 and conductive electrode 10 are near ground potential, and element 1 is at ground potential. Under these conditions the surface AB is lowered to a potential near the potential of cathode 27' and negative relative to ground, as illustrated in FIG. 19.

The manner in which the above is accomplished may be seen from the simplified equivalent diagram shown in FIG. 20. Since element 10 is a conductor, it represents a unipotential surface. The surface AB of photoconductor 8 may be considered to be made up of a great number of contiguous elemental areas $a_1 \ldots a_n$ which form elemental capacitors $c_1 \ldots c_n$ with the electrode 10. Each elemental capacitor is shunted by a resistor $r$ representing the shunt conductance of the photoconductor. When electrons from cathode 27' impinge on the surface AB each elemental area may be considered as being connected to the negative terminal of source 42 by a relatively small resistance, such as $R_1$, representing the resistance of the electron path and the cathode 27'. With S4 open to represent the conditions prior to step 1, i.e. cathode 27' inactive, the elemental areas $a_1 \ldots a_n$ all have the potential of electrode 10 and there is consequently no charge on the elemental capacitors $c_1 \ldots c_n$. At the start of step 1, cathode 27' begins to emit electrons, which may be represented by closing S4. Assuming the circuit parameters to be such that the secondary emission ratio at surface AB is less than unity, the elemental capacitors now begin to charge with the result that the elemental area potentials fall, as along line 44 in FIG. 19, stabilizing at a potential somewhere above cathode potential as determined by the ratio of $r$ to R. Resistors $R_1 \ldots R_n$ are all equal, however resistors $r_1 \ldots r_n$ differ from each other as the conductivity of the photoconductor is influenced by the infrared image. Therefore, the elemental areas $a_1 \ldots a_n$ will have different potentials at the end of step 1 as determined by the energy distribution in the infrared image, however, these potentials will all be somewhat above cathode potential and negative relative to ground, as seen in FIG. 21, to be explained later.

*Step 2.*—The purpose of this step is to provide an interval $t$ during which the elemental area potentials can separate to increase the contrast. Since the resistors $r_1 \ldots r_n$ differ from each other in accordance with the infrared image intensity distribution but the elemental capacitors $c_1 \ldots c_n$ are all of the same size, the time constants $r_1c_1 \ldots r_nc_n$ differ and the capacitors discharge at different rates. The discharge of a single elemental capacitor is represented by line 45 in FIG. 19. This difference in discharge rates results in a wider range of potentials on the surface AB than was present at the start of step 2, as illustrated in FIG. 21 where $a_1$, $a_2 \ldots a_n$ represent the elemental area potentials at the start of step 2 and $a_1'$, $a_2' \ldots a_n'$ represents the elemental area potentials after the interval $t$.

*Step 3.*—The purpose of this step, which is similar in all respects to step 4 for FIG. 14, is to produce an electron flow into holes 2 of the surface AB that is representative of the potential distribution on this surface. With S3 on contacts "c," light source 31' is again energized and, with the cathode at ground potential, uniformly floods the surface AB with low velocity electrons. The number of these electrons that enter any hole 2 is determined by the potential on the elemental area containing the hole. The highest potential an elemental area can have is zero relative to electrode 10, this potential representing a completely discharged elemental capacitor. If the potential of an elemental area is more negative than a value represented by line 41 in FIG. 21, no electrons will enter the holes 2 in that area but will return to collector 29. Therefore, the interval $t$ between the initiation of step 2 and the start of step 3 should be so selected that by the end of the interval all elemental areas have risen above the cutoff potential represented by line 41 but none has reached the condition of zero potential relative to electrode 10. Further, $t$ should not be so long that step 3 can not be completed before the elemental areas begin to reach zero potential. Within these limits, however, the longer the interval $t$ the greater the contrast in the produced image will be. A short step 3 therefore favors high contrast since it permits a longer $t$. The electrons entering the holes 2 are accelerated toward the phosphor elements 3 by the high potential applied to element 1 through contact VIc. This results in the emission of an intensified electron image from photoemissive elements 4, as already explained.

*Step 4.*—Erasure. No erasing operation of conductivity is possible. The persistence of the photon induced conductivity depends upon the carrier lifetime of the particular material. The time between cycles therefore must be sufficient for the induced conductivity to disappear naturally. Any charge pattern on AB will be removed in time by the complete discharge of the elemental capacitors through photoconductor conductivity which does not fall below the dark value, or it will be removed in step 1 of the next cycle.

The foregoing operation of FIG. 18 holds regardless of the length of time during which the conductivity changes produced by radiation persist after the radiation is removed, since the optical image remains on the photoconductor throughout the cycle. With photoconductors of long persistence, however, a slightly different mode of operation may be employed in that the photoconductor need be exposed only for a short interval prior to step 1, since the conductivity change will hold through the cycle of operation.

A third mode of operating the basic structure of FIG. 6 is shown in the high gain image intensifier system of FIG. 22. In this mode, element 8 of the structure 25 is made of a semiconductor capable of electron bombardment induced conductivity. Examples of suitable semiconductors for this purpose have already been given. The operation of FIG. 22 is very similar to that of FIG. 18, the principal difference being that instead of focusing the optical image on element 8 as in FIG. 18 the image is formed on photocathode 27, as in FIG. 14, and the resulting electron image is focused on surface AB by suitable magnetic or electrostatic focusing means (not shown). The electron image produces conductivity changes in the semiconductor 8 similar to the conductivity changes produced in photoconductive element 8 in FIG. 18. A cycle of operation comprises five steps, as follows:

*Step 1.*—Switch S5 on "a" contacts. The electron image produced by photocathode 27 as the result of an optical image formed thereon by lens system 30 impinges on the surface AB of semiconductor 8 causing a conductivity pattern corresponding to the electron density pattern of the electron image.

*Step 2.*—S5 on "b" contacts. Surface AB uniformly flooded with electrons from photocathode 27 which is illuminated by light source 31. With the parameters so selected that the secondary emission yield from surface AB is less than unity, the surface AB is charged negatively near to cathode potential and below ground as in FIG. 18, step 1.

*Step 3.*—S5 on "c" contacts. Identical to FIG. 18, step 2.

*Step 4.*—S5 on "d" contacts. Identical to FIG. 18, step 3.

*Step 5.*—Erasure. No erasing operation of the electron bombardment induced conductivity is possible. The persistence of the induced conductivity depends upon the carrier lifetime of the particular semiconductor material. The time between cycles therefore must be sufficient for the induced conductivity to disappear naturally. Any charge pattern on AB will be removed in time by the complete discharge of the elemental capacitors through the semiconductor conductivity, or it will be removed in step 2 of the next cycle of operation.

The contrast in the intensified electron images produced by FIGS. 18 and 22 may be increased by a technique illustrated in FIG. 23. In this figure, time $t_0$ represents the start of step 2 in FIG. 18 or the start of step 3 in FIG. 22. Point 51 represents the potential of elemental area $a_1$ on surface AB at $t_0$ and point 52 represents the potential of another elemental area $a_2$ on this surface at $t_0$. The curves 53 and 54 are identical and represent the rate of change of the potential of $a_1$ due to the discharging of the elemental capacitor associated with $a_1$ through the element 8 conductance. Similarly, curves 55 and 56 are identical and represent the rate of change of the potential of elemental area $a_2$. As seen, the slope of curve 55–56 is steeper than that of curve 53–54 indicating a higher rate of change of the $a_2$ potential. This is of course due to the different time constants of the discharge circuits of the two elemental capacitors caused by the different conductivities of the element 8.

At time $t_1$ elemental area $a_1$ has reached the potential of point 57 and $a_2$ has reached the potential of point 58. The difference between the two potentials is then $\Delta_1$. At $t_1$, for a short time, the surface AB of element 8 is uniformly flooded with electrons, as in steps 2 and 3 of FIGS. 18 and 22, respectively, and the negative charge on the surface is increased. This lowers the potentials of $a_1$ and $a_2$ to points 59 and 60, respectively. The potential of $a_1$ then begins to rise along curve 54 from point 59 and the potential of $a_2$ begins to rise along the curve 56 from point 60. At $t_2$ the potential of $a_1$ is at point 61 and the potential of $a_2$ is at point 62. The difference in their potentials at $t_2$ is therefore $\Delta_2$. Had the additional negative charge not been applied, the potentials of $a_1$ and $a_2$ would have continued to rise along curves 53 and 55 to points 63 and 64, and their potential difference at $t_2$ would have been $\Delta_3$. The difference $\Delta_3$ is less that $\Delta_2$ however, showing that the added negative charge produced an increase in contrast.

In FIG. 18, the additional negative charge may be applied by programming S3 to return to contact "a" momentarily at a time $t_1$ after the start of step 2, and then to return to contact "b" for the remainder of step 2. Similarly, in FIG. 22, S5 may be programmed to return to contact "b" momentarily at a time $t_1$ after the start of step 3, and to return to contact "c" for the remainder of step 3. This action may be accomplished by a switch programmer 65 the specific design of which would depend upon the type of switching used and is a routine matter forming no part of the invention.

Returning to FIG. 14 for the moment, in step 2 of the operation of this system a negative initial charge is formed on surface AB by grounding the photocathode 27 and applying a positive rectangular pulse 35 to electrode 10. In FIG. 18 (step 1) and FIG. 22 (step 2) this is accomplished by making the cathode 27 or 27' negative relative to ground for a sufficient length of time and returning it to ground potential. The method of FIGS. 18 and 22 may be used in FIG. 14 if desired.

Although the systems in FIGS. 14, 18 and 22 are shown with solid state structures 25 in the form of the basic structure of FIG. 6, they are not limited thereto, and any of the structures shown in FIGS. 7, 8, 9, 10, 12 and 13 may be substituted. Further, where the output of structure 25 is an electron image, this image may be further intensified in an additional stage, or additional cascaded stages, of an image intensifier such as shown in FIGS. 1, 3 or 4, after which the image may be applied to a phosphor screen, such as shown in FIG. 5, or a Lenard window such as shown by elements 1 and 13 of FIG. 8, or to a transmission type secondary emission window such as constituted by elements 1, 16, 17 and a suitable positive electrode such as 18 in FIG. 9.

The systems shown in FIGS. 18 and 22 have very high sensitivity, however, the electron image produced by them is of short duration. If it is desired to store the information in these images, or to prolong the image for photographic exposure purposes, this may be accomplished by applying the short duration electron image to a phosphor screen and applying the resulting optical image to the system of FIG. 14 by means of lens system 30.

I claim:

1. An electron image intensifier with a memory capability, comprising: a solid state structure having a first element in the form of a conductive opaque plate, a second element in the form of a layer of insulating material on one surface of said plate, a third element in the form of a thin conductive layer on said second element and a fourth element in the form of a coating of insulating material on said third element, said structure having holes uniformly distributed over its surface and extending completely therethrough in a direction normal to said surface, said holes being of such diameter and spacing that several holes are included in the minimum elemental area it is desired to resolve in the electron image to be intensified, the spaces formed by said holes in said first element being filled with a phosphor material at their ends nearest said second element and with a photoemissive material at their other ends; means for applying an electron image to said fourth element; means operativve in the first of a series of steps for uniformly flooding said fourth element with electrons under less than unity secondary emission ratio conditions for establishing the outer surface of said fourth element at an initial potential relative to said third element; means operative in the second of said series of steps to establish greater than unity secondary emission ratio conditions at said fourth element for a predetermined time interval whereby said fourth element acquires a charge distribution and its surface to which said electron image is applied acquires a potential distribution corresponding to the electron density distribution of said electron image; and means operating during the third of said series of steps for uniformly flooding said fourth element with low velocity electrons and for establishing said first element at a positive potential relative to said third element.

2. Apparatus as claimed in claim 1 in which there are provided means operative during a fourth of said series of steps for uniformly flooding said fourth element with electrons under greater than unity secondary emission ratio conditions to erase the charge pattern on said fourth element.

3. An electron image intensifier with a memory capability, comprising: a solid state structure having a first element in the form of a plate of opaque insulating material, said plate having holes uniformly distributed over its surface and extending completely therethrough in a direction normal to said surface, said holes being of such diameter and spacing that several holes are included in the minimum elemental area it is desired to resolve in the electron image to be intensified, said holes being filled with a phosphor material at one end and with a photoemissive material at the other end, and an electron pervious conductive coating over said plate on the phosphor side, a second element in the form of a layer of insulating material over said conductive coating, a third element in the form of a thin conductive layer on said second element and a fourth element in the form of a coating of insulating material on said third element, said second, third and fourth elements having holes extending therethrough that are continuations of the holes in said first element; means for applying an electron image to said fourth element; means operative in the first of a series of steps for uniformly flooding said fourth element with electrons under less than unit secondary emission ratio conditions for establishing the outer surface of said fourth element at an initial potential relative to said third element; means operative in the second of said series of steps to establish greater than unity secondary emission ratio conditions at said fourth element for a predetermined time interval whereby said fourth element acquires a charge distribution and its surface to which said electron image is applied acquires a potential distribution corresponding to the electron density distribution of said electron image; and means operating during the third of said series of steps for uniformly flooding said fourth element with low velocity electrons and for establishing the conductive coating on said first element at a positive potential relative to said third element.

4. Apparatus for converting an optical image into a high intensity electron image, comprising: a solid state structure having a first element in the form of a conductive opaque plate, a second element in the form of a layer of insulating material on one surface of said plate, a third element in the form of a thin conductive layer on said second element and a fourth element in the form of a coating of photoconductive material on said third element, said structure having holes uniformly distributed over its surface and extending completely therethrough in a direction normal to said conductive plate, said holes being of such diameter and spacing that several holes are included in the minimum elemental area it is desired to resolve in the optical image to be converted, the spaces formed by said holes in said first element being filled with a phosphor material at their ends nearest said second element and with a photoemissive material at their other ends; means for forming the optical image to be converted on said fourth element; means operative in the first of a series of steps for uniformly flooding said fourth element with electrons under less than unity secondary emission ratio conditions for establishing an initial negative charge on said fourth element; means operative in the second of said series of steps for letting said fourth element discharge for a predetermined interval through its conductance to establish a potential pattern on the surface of said fourth element corresponding to the energy distribution in said optical image; and means operative during the third of said series of steps for uniformly flooding said fourth element with low velocity electrons and for establishing said first element at a positive potential relative said third element.

5. Apparatus as claimed in claim 4 in which means are provided operative at a predetermined instant after the start of said second step for re-establishing the conditions of said first step for a predetermined interval after which a return is made to the conditions of said second step.

6. Apparatus for converting an optical image into a high intensity electron image, comprising: a solid state structure having a first element in the form of a plate of opaque insulating material, said plate having holes uniformly distributed over its surface and extending completely therethrough in a direction normal to said surface, said holes being of such diameter and spacing that several holes are included in the minimum elemental area it is desired to resolve in the optical image to be converted, said holes being filled with a phosphor material at one end and with a photoemissive material at the other end, and an electron pervious conductive coating over said plate on the phosphor side, a second element in the form of a layer of insulating material over said conductive coating, a third element in the form of a thin conductive layer on said second element and a fourth element in the form of a coating of photoconductive material on said third element, said second, third and fourth elements having holes extending therethrough that are continuations of the holes in said first element; means for forming the optical image to be converted on said fourth element; means operative in the first of a series of steps for uniformly flooding said fourth element with electrons under less than unit secondary emission ratio conditions for establishing an initial negative charge on said fourth element; means operative in the second of said series of steps for letting said fourth element discharge for a predetermined interval through its conductance to establish a potential pattern of the surface of said fourth element corresponding to the energy distribution in said optical image; and means operative during the third of said series of steps for uniformly flooding said fourth element with low velocity electrons and for establishing the conductive coating on said first element at a positive potential relative to said third element.

7. A high gain electron image intensifier, comprising: a solid state structure having a first element in the form of a conductive opaque plate, a second element in the form of a layer of insulating material on one surface of said plate, a third element in the form of a thin conductive layer on said second element and a fourth element in the form of a coating on said third element of a semiconductor exhibiting electron bombardment induced conductivity, said structure having holes uuniformly distributed over its surface and extending completely therethrough in a direction normal to said conductive plate, said holes being of such diameter and spacing that several holes are included in the minimum elemental area it is desired to resolve in the electron image to be intensified, the spaces formed by said holes in said first element being filled with a phosphor material at their ends nearest said second element and with a photoemissive material at their other ends, means for applying the electron image to be intensified to said fourth element; means operative in the first of a series of steps for uniformly flooding said fourth element with electrons under less than unity secondary emission ratio conditions for establishing an initial negative charge on said fourth element; means operative in the second of said series of steps for letting said fourth element discharge for predetermined interval through its conductance to establish a potential pattern on the surface of said fourth element corresponding to the electron density distribution in said electron image; and means operative during the third of said series of steps for uniformly flooding said fourth element with low velocity electrons and for establishing said first element as a positive potential relative to said third element.

8. Apparatus as claimed in claim 7 in which means are provided operative at a predetermined instant after the start of said second step for re-establishing the conditions of said first step for a predetermined interval after which a return is made to the conditions of said second step.

9. A high gain electron image intensifier, comprising: a solid state structure having a first element in the form of a plate of opaque insulating material, said plate having holes uniformly distributed over its surface and extending completely therethrough in a direction normal to said surface, said holes being of such diameter and spacing that several holes are included in the minimum elemental area it is desired to resolve in the electron image to be intensified, said holes being filled with a phosphor material at one end and with a photoemissive material at the other end, and an electron pervious conductive coating over said plate on the phosphor side, a second element in the form of a layer of insulating material over said conductive coating, a third element in the form of a thin conductive layer on said second element and a fourth element in the form of a coating on said third element of a semiconductor exhibiting electron bombardment induced conductivity, said second, third and fourth elements having holes extending therethrough that are continuations of the holes in said first element; means for applying the electron image to be intensified to said fourth element; means operative in the first of a series of steps for uniformly flooding said fourth element with electrons under less than unity secondary emission ratio conditions for establishing an initial negative charge on said fourth element; means operative in the second of said series of steps for letting said fourth element discharge for a predetermined interval through its conductance to establish a potential pattern on the surface of said fourth element corresponding to the electron density distribution in said electron image; and means operative during the third of said series of steps for uniformly flooding said fourth element with low velocity electrons and for establishing the conductive coating on said first element at a positive potential relative to said third element.

References Cited by the Examiner

UNITED STATES PATENTS

| | | | |
|---|---|---|---|
| 2,373,661 | 4/1945 | DePhillips | 313—74 |
| 2,598,401 | 5/1952 | Lubszynski et al. | 313—92 |
| 2,805,360 | 9/1957 | McNaney | 313—92 |
| 2,826,714 | 3/1958 | Forgue | 315—12 |
| 2,875,360 | 2/1959 | Kruper | 315—10 |
| 2,898,499 | 8/1959 | Sternglass et al. | 313—103 |
| 2,981,863 | 4/1961 | Schneeberger et al. | 215—12 |
| 2,996,634 | 8/1961 | Woodcock | 313—92 |
| 3,059,118 | 10/1962 | Koury | 313—108.1 |
| 3,086,139 | 4/1963 | Lehrer | 315—12 |

DAVID G. REDINBAUGH, *Primary Examiner.*

J. A. O'BRIEN, J. E. BECK, T. A. GALLAGHER,
*Assistant Examiners.*